(12) United States Patent
Nakamura et al.

(10) Patent No.: US 10,270,611 B2
(45) Date of Patent: Apr. 23, 2019

(54) INFORMATION PROCESSING METHOD AND INFORMATION PROCESSING SYSTEM

(71) Applicant: FUJITSU LIMITED, Kawasaki-shi, Kanagawa (JP)

(72) Inventors: Yosuke Nakamura, Kawasaki (JP); Junya Kani, Kawasaki (JP); Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/710,142

(22) Filed: Sep. 20, 2017

(65) Prior Publication Data

US 2018/0109394 A1    Apr. 19, 2018

(30) Foreign Application Priority Data

Oct. 14, 2016   (JP) ................................. 2016-202417

(51) Int. Cl.
    *H04L 12/28*    (2006.01)
(52) U.S. Cl.
    CPC ........ *H04L 12/2805* (2013.01); *H04L 12/282* (2013.01); *H04L 12/2809* (2013.01); *H04L 12/281* (2013.01)
(58) Field of Classification Search
    None
    See application file for complete search history.

(56) References Cited

U.S. PATENT DOCUMENTS

| 2005/0044201 A1* | 2/2005 | Suzuki | H04L 29/06 709/223 |
| 2006/0094360 A1 | 5/2006 | Jung et al. | |
| 2007/0115996 A1* | 5/2007 | Shitano | H04L 12/2803 370/392 |
| 2007/0124513 A1* | 5/2007 | Kikuchi | G06F 8/62 710/8 |

FOREIGN PATENT DOCUMENTS

| JP | 2002-16619 | 1/2002 |
| JP | 2004-120241 | 4/2004 |
| JP | 2007-25846 | 2/2007 |
| JP | 2009-20903 | 1/2009 |

* cited by examiner

*Primary Examiner* — Cassandra F Cox
(74) *Attorney, Agent, or Firm* — Fujitsu Patent Center

(57) ABSTRACT

An information processing method includes coupling, by a terminal device of a plurality of terminal devices, to a device of a plurality of devices through wireless communication; transmitting a completion notification indicating that the coupling to the device is successful to an information processing device; referring, by the information processing device, to management information in which a first identifier, a second identifier, and a connection status of connection with the plurality of terminal devices are associated with each other for each of the plurality of devices to identify the second identifier that is included in the completion notification and associated with the first identifier that is used to identify the device, by using the information processing device, transmitting the identified second identifier to the terminal device; and displaying, by the terminal device, the identified second identifier.

9 Claims, 24 Drawing Sheets

FIG. 7

| RECORD ID | UNIQUE ID | OPERATIONAL ID | TERMINAL ID |
|---|---|---|---|
| 1 | A0123 | 1 | T03 |
| 2 | A0125 | 2 | NO CONNECTION |
| 3 | A0141 | 2 | T01 |
| 4 | NO SETTING | NO SETTING | NO SETTING |
| ⋮ | ⋮ | ⋮ | ⋮ |

FIG. 11

New electronic clinical thermometer has been registered.
Operation ID is "4". — 101

FIG. 13

This electronic clinical thermometer is already registered. Operation ID is "1". ⟵ 101

INFORMATION PROCESSING METHOD AND INFORMATION PROCESSING SYSTEM

CROSS-REFERENCE TO RELATED APPLICATION

This application is based upon and claims the benefit of priority of the prior Japanese Patent Application No. 2016-202417, filed on Oct. 14, 2016, the entire contents of which are incorporated herein by reference.

FIELD

The embodiments discussed herein are related to an information processing method and an information processing system.

BACKGROUND

In the Internet of Things (IoT), a device such as a portable device or a home appliance, for example, may be connected to a user terminal by short-range wireless communication, and the user terminal may be used to operate the device.

When a plurality of devices are present near a user terminal, the user terminal may detect the plurality of devices. In such a case, even when the user terminal is connected to one of the terminals, the user may incorrectly identify that the user terminal is connected to another terminal. It is desirable that the user be able to easily identify the devices connected to the terminal. As the related art, Japanese Laid-open Patent Publication No. 2009-20903, Japanese Laid-open Patent Publication No. 2007-25846, Japanese Laid-open Patent Publication No. 2002-16619, Japanese Laid-open Patent Publication No. 2004-120241, and so on have been disclosed.

SUMMARY

According to an aspect of the invention, an information processing method executed by an information processing system including a plurality of terminal devices and an information processing device, the information processing method includes coupling, by a terminal device of the plurality of terminal devices, to a device of a plurality of devices through wireless communication; transmitting a completion notification indicating that the coupling to the device is successful to the information processing device; referring, by the information processing device, to management information in which a first identifier, a second identifier, and a connection status of connection with the plurality of terminal devices are associated with each other for each of the plurality of devices to identify the second identifier that is included in the completion notification and associated with the first identifier that is used to identify the device, by using the information processing device, transmitting the identified second identifier to the terminal device; and displaying, by the terminal device, the identified second identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a table;

FIG. 11 is a diagram illustrating an example of a second display;

FIG. 13 is a diagram illustrating an example of a third display;

DESCRIPTION OF EMBODIMENTS

First Embodiment

Figure 1:
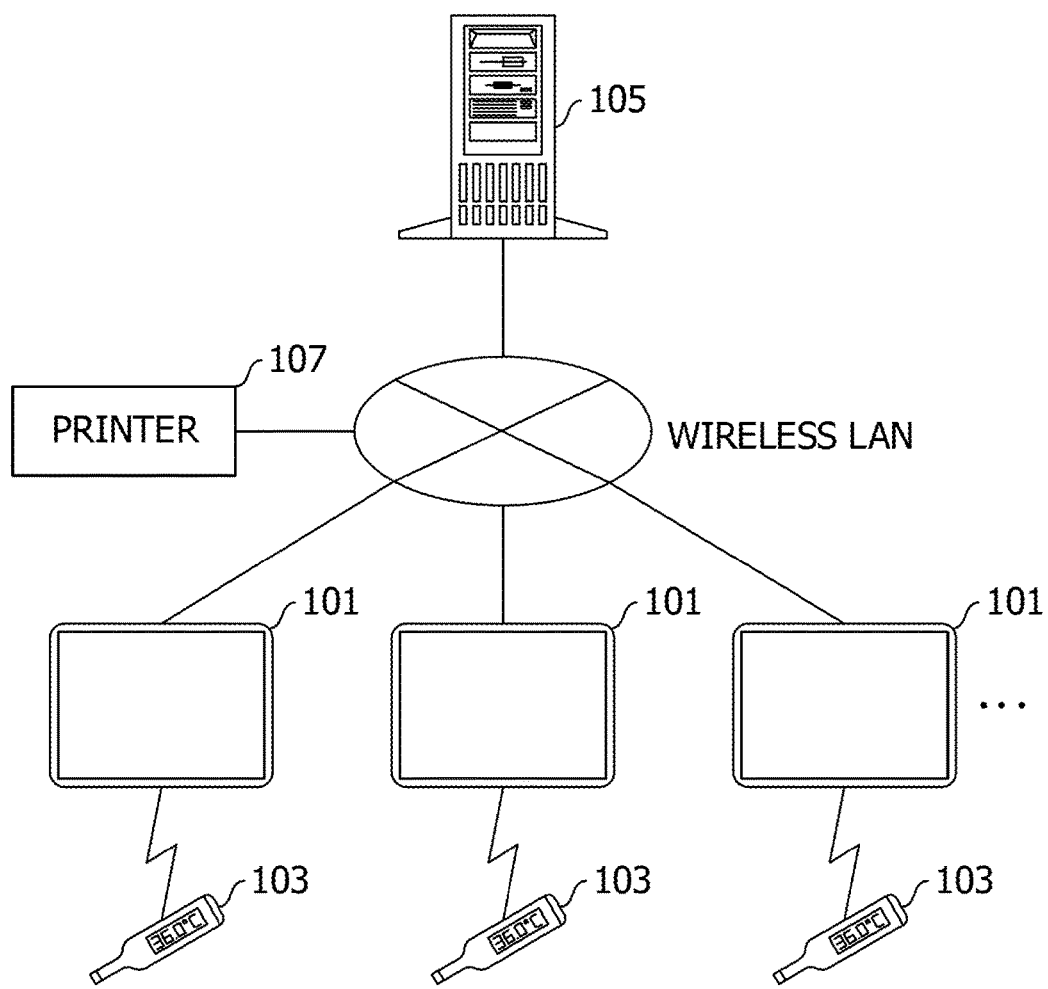
FIG. 1 is a diagram illustrating an example of a network configuration.

FIG. 1 illustrates an example of a network configuration. This example is expected to be used for a thermometry system at a medical facility. A nurse, which is a user, uses a tablet terminal 101. The tablet terminal 101 communicates with an electronic clinical thermometer 103 by using short-range wireless communication (for example, a Bluetooth (registered trademark) Low Energy (BLE) communication scheme). Body temperature data measured by the electronic clinical thermometer 103 is transferred to the tablet terminal 101. Each electronic clinical thermometer 103 contains a unique ID.

The tablet terminal 101 is connected to a server 105 via a wireless local area network (LAN). The server 105 manages the electronic clinical thermometer 103. Specifically, the server 105 allocates, to the electronic clinical thermometer 103, an operation ID used for identifying the electronic clinical thermometer 103 in the operation. A printer 107 prints an operation ID on a label in accordance with an instruction from the server 105 or the tablet terminal 101.

Figure 2:
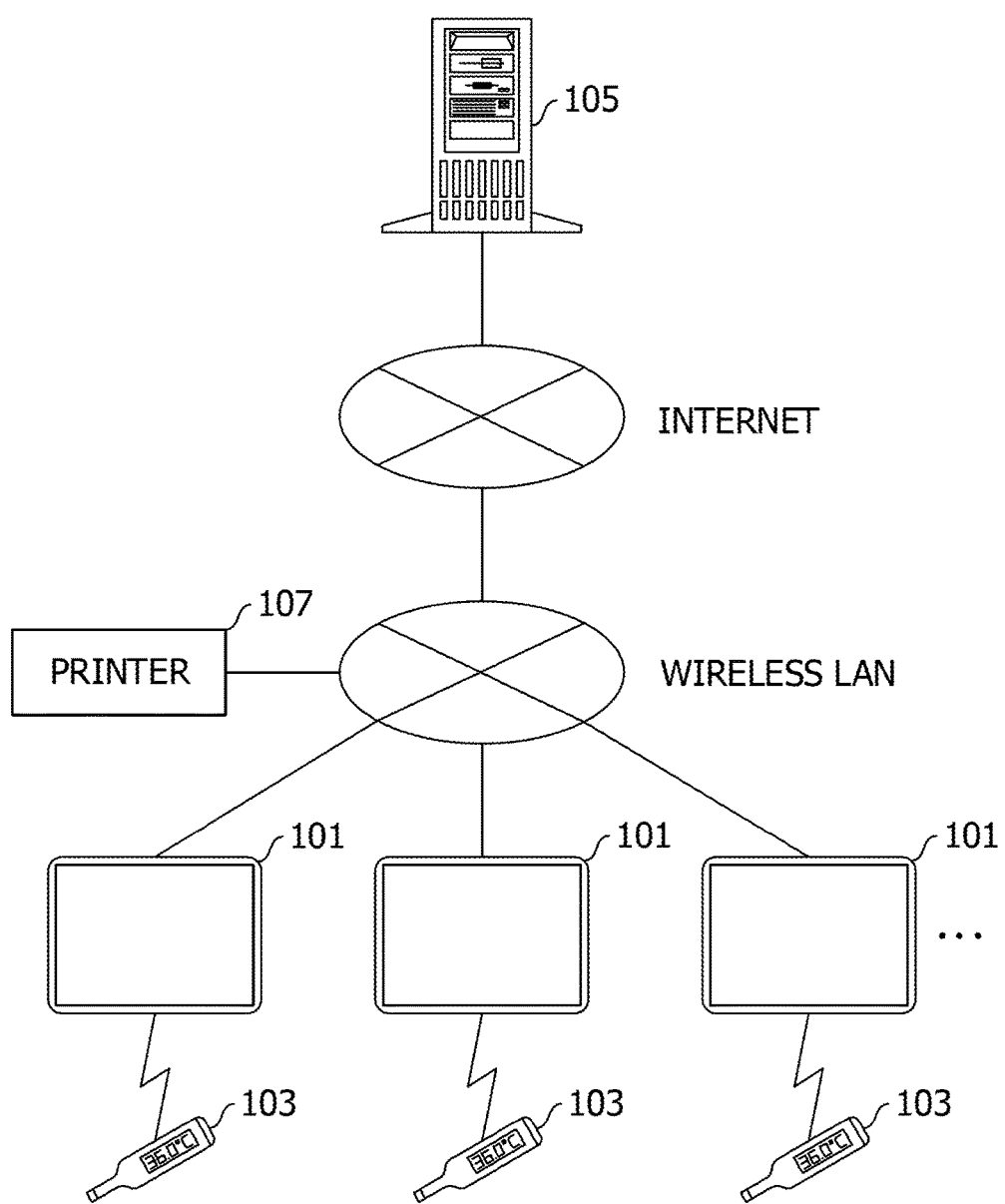
FIG. 2 is a diagram illustrating an example of a network configuration.

As illustrated in FIG. 2, the server 105 may be provided as a cloud service. In this case, the tablet terminal 101 is connected to the server 105 via a wireless LAN and the Internet. Alternatively, the tablet terminal 101 may be connected to the server 105 via a mobile communication network and the Internet.

Figure 3:
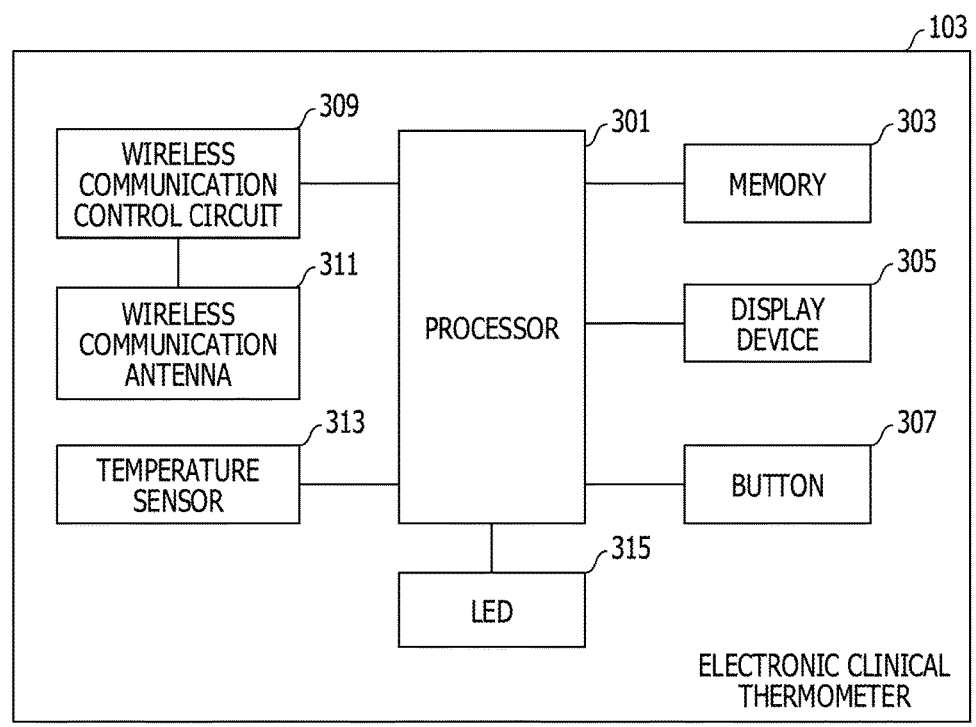
FIG. 3 is a diagram illustrating an example of a hardware configuration of an electronic clinical thermometer.

FIG. 3 illustrates an example of a hardware configuration of the electronic clinical thermometer 103. The electronic clinical thermometer 103 includes a processor 301, a memory 303, a display device 305, a button 307, a wireless communication control circuit 309, a wireless communication antenna 311, a temperature sensor 313, and a light emitting diode (LED) 315.

The processor 301 executes a program stored in the memory 303. The memory 303 stores a program and data therein. The display device 305 displays numbers and a symbol. The button 307 accepts a user instruction. The wireless communication antenna 311 transmits and receives a radio wave by using short-range communication scheme (for example, a BLE communication scheme). The wireless communication control circuit 309 controls wireless communication in accordance with a frequency used in the scheme. For example, a beacon signal is transmitted from the wireless communication control circuit 309 and the wireless communication antenna 311. The transmission of the beacon signal may be used for an advertisement. The temperature sensor 313 is used for measuring body temperature.

The electronic clinical thermometer 103 is an example of a device connected to a user terminal through wireless communication. The device connected to the user terminal through wireless communication may be a portable device having a sensor other than the temperature sensor 313. The device connected to the user terminal through wireless communication may be a portable device without a sensor. The device connected to the user terminal through wireless communication may be an installed device such as an item of furniture, a home appliance, or an audio device, for example. The device connected to the user terminal through wireless communication may be a vehicle such as a bicycle or an automobile.

Figure 4:
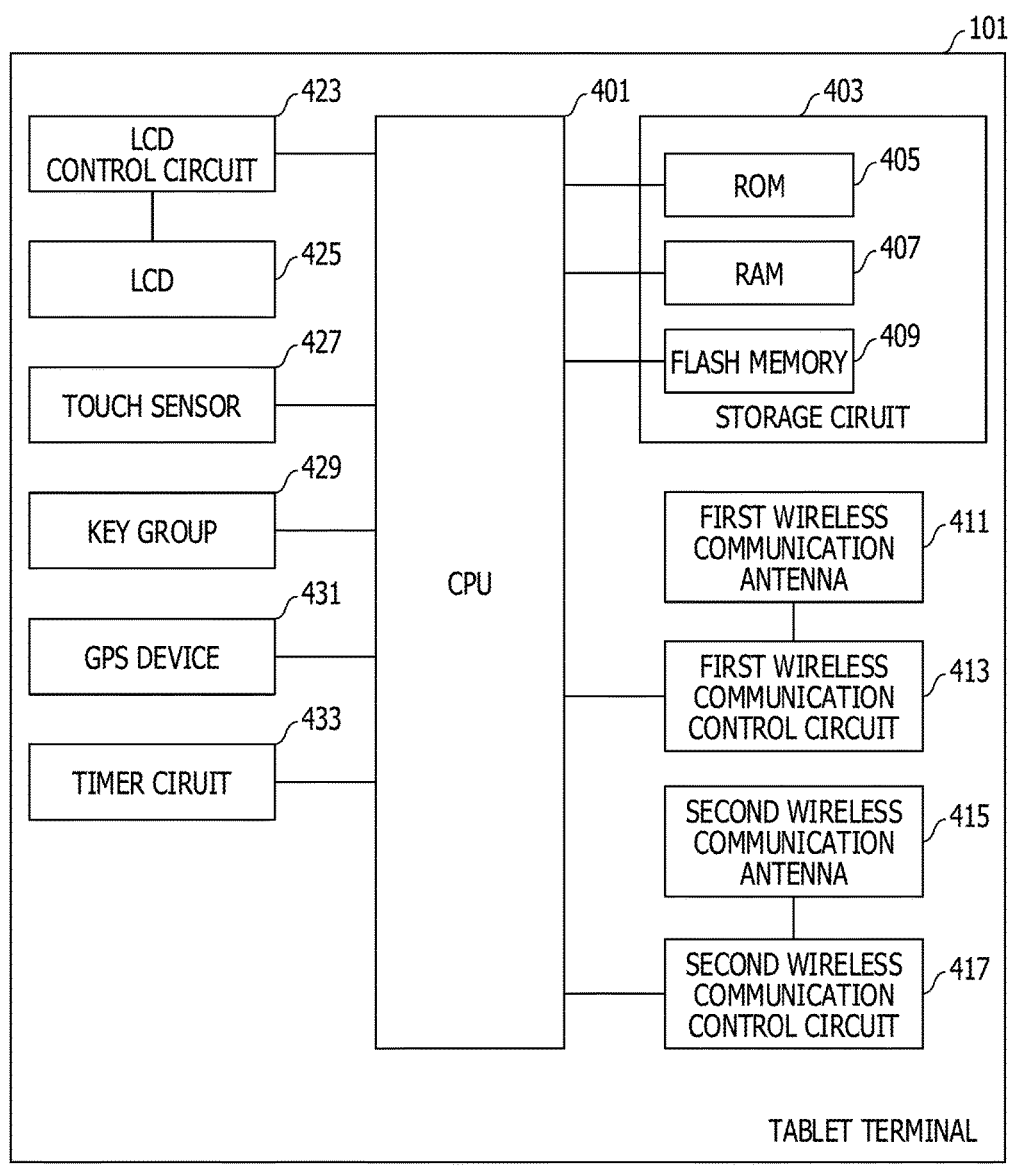
FIG. 4 is a diagram illustrating an example of a hardware configuration of a tablet terminal.

FIG. 4 illustrates an example of a hardware configuration of the tablet terminal 101. The tablet terminal 101 includes a central processing unit (CPU) 401, a storage circuit 403, a first wireless communication antenna 411, a first wireless communication control circuit 413, a second wireless communication antenna 415, a second wireless communication control circuit 417, a liquid crystal display (LCD) control circuit 423, an LCD 425, a touch sensor 427, a key group 429, a global positioning system (GPS) device 431, and a timer circuit 433.

The CPU 401 executes a program stored in the storage circuit 403. The storage circuit 403 has a read-only memory (ROM) 405, a random access memory (RAM) 407, and a flash memory 409, for example. The ROM 405 stores a fundamental program or initial data therein, for example. The RAM 407 includes an area in which a program is expanded. The RAM 407 includes an area in which transient data is stored. The flash memory 409 stores a program such as an application or user data therein, for example.

The LCD control circuit 423 causes a clock circuit to operate at a predetermined operation frequency and drive the LCD 425. The LCD 425 displays various windows. The touch sensor 427 is a panel-like sensor arranged on the display screen of the LCD 425 and accepts an instruction through a touch operation. Specifically, the LCD 425 and the touch sensor 427 are used together as an integrated touch panel. Each hard key of the key group 429 is provided on a part of a casing.

The first wireless communication antenna 411 transmits and receives a radio wave in a cellular system or a wireless LAN system. The first wireless communication control circuit 413 controls wireless communication in accordance with a frequency used in such a system. The second wireless communication antenna 415 transmits and receives a radio wave in a short-range communication system (for example, the BLE communication system) common to the electronic clinical thermometer 103. The second wireless communication control circuit 417 controls wireless communication in accordance with a frequency used in such a system.

The GPS device 431 measures a geographical location thereof. The timer circuit 433 measures time.

Figure 5:
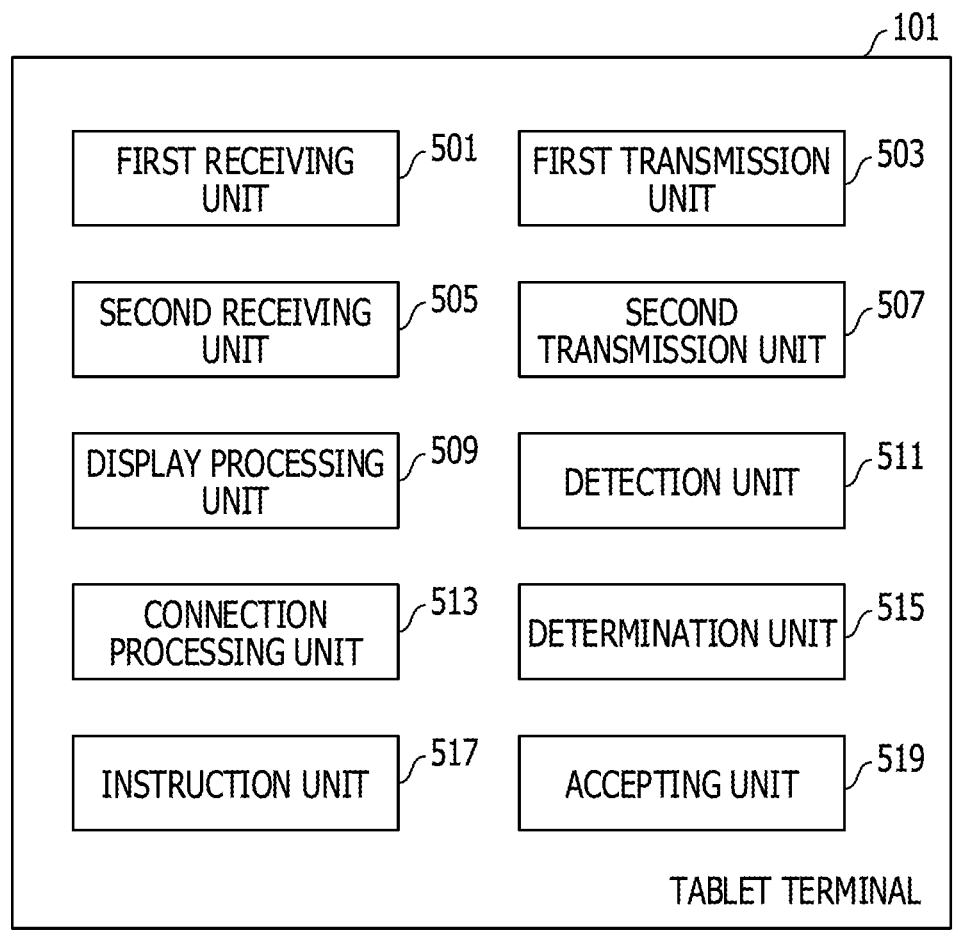
FIG. 5 is a diagram illustrating an example of a module configuration of the tablet terminal.

FIG. 5 illustrates an example of module communication of the tablet terminal 101. The tablet terminal 101 includes a first receiving unit 501, a first transmission unit 503, a second receiving unit 505, a second transmission unit 507, a display processing unit 509, a detection unit 511, a connection processing unit 513, a determination unit 515, an instruction unit 517, and an accepting unit 519.

The first receiving unit 501 receives various data from the electronic clinical thermometer 103. The first transmission unit 503 transmits various data to the electronic clinical thermometer 103. The second receiving unit 505 receives various data from the server 105. The second transmission unit 507 transmits various data to the server 105. The display processing unit 509 performs a process of displaying a display. The detection unit 511 detects the electronic clinical thermometer 103 which is in close proximity thereof. The connection processing unit 513 performs processes of establishing and cancelling a connection to the electronic clinical thermometer 103. The determination unit 515 determines whether or not a new beacon signal is received. The instruction unit 517 instructs the electronic clinical thermometer 103 to switch the LED 315 on and off. The receiving unit 519 accepts a user instruction operation.

The first receiving unit 501, the first transmission unit 503, the second receiving unit 505, the second transmission unit 507, the display processing unit 509, the detection unit 511, the connection processing unit 513, the determination unit 515, the instruction unit 517, and the accepting unit 519 are implemented by using hardware resources (as illustrated, for example, in FIG. 4) and a program for causing a processor to execute processes described below.

Figure 6:
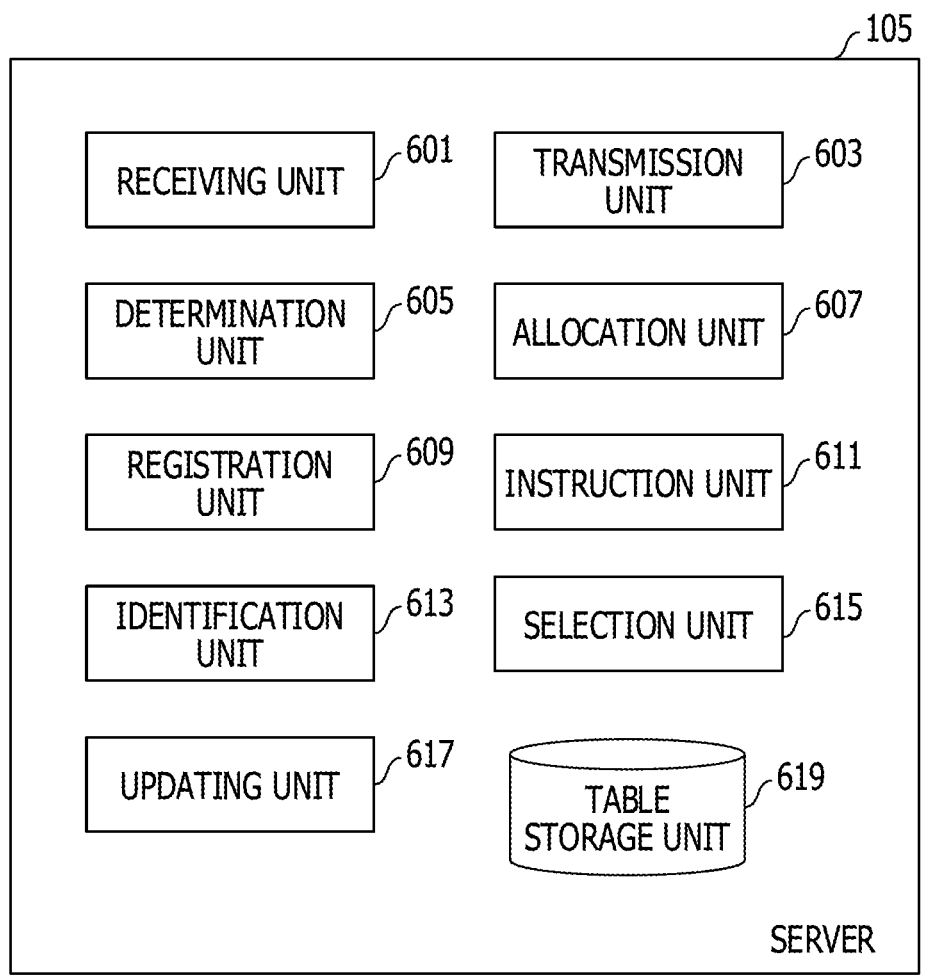
FIG. 6 is a diagram illustrating an example of a module configuration of a server.

FIG. 6 illustrates an example of a module configuration of the server 105. The server 105 includes a receiving unit 601, a transmission unit 603, a determination unit 605, an allocation unit 607, a registration unit 609, an instruction unit 611, an identification unit 613, a selection unit 615, an updating unit 617, and a table storage unit 619.

The receiving unit 601 receives various data from the tablet terminal 101. The transmission unit 603 transmits various data to the tablet terminal 101. The determination unit 605 determines whether or not the electronic clinical thermometer 103 to be registered is unknown, that is, whether or not the electronic clinical thermometer 103 to be registered has already been registered. The allocation unit 607 allocates a new operation ID to the electronic clinical thermometer 103 to be registered. The registration unit 609 registers information on the electronic clinical thermometer 103 by storing the information in a table. The instruction unit 611 instructs the printer 107 to print the operation ID. The identification unit 613 identifies the operation ID corresponding to a unique ID. The selection unit 615 selects the electronic clinical thermometer 103 which is not connected to any of the tablet terminals 101 out of the electronic clinical thermometers 103 which are detected by the tablet terminal 101. The updating unit 617 updates a table. The table storage unit 619 stores a table therein. The table will be described later by using FIG. 7.

The receiving unit 601, the transmission unit 603, the determination unit 605, the allocation unit 607, the registration unit 609, the instruction unit 611, the identification unit 613, the selection unit 615, and the updating unit 617 are implemented by using hardware resources (as illustrated, for example, in FIG. 24) and a program for causing a processor to execute processes described below.

Figure 24:
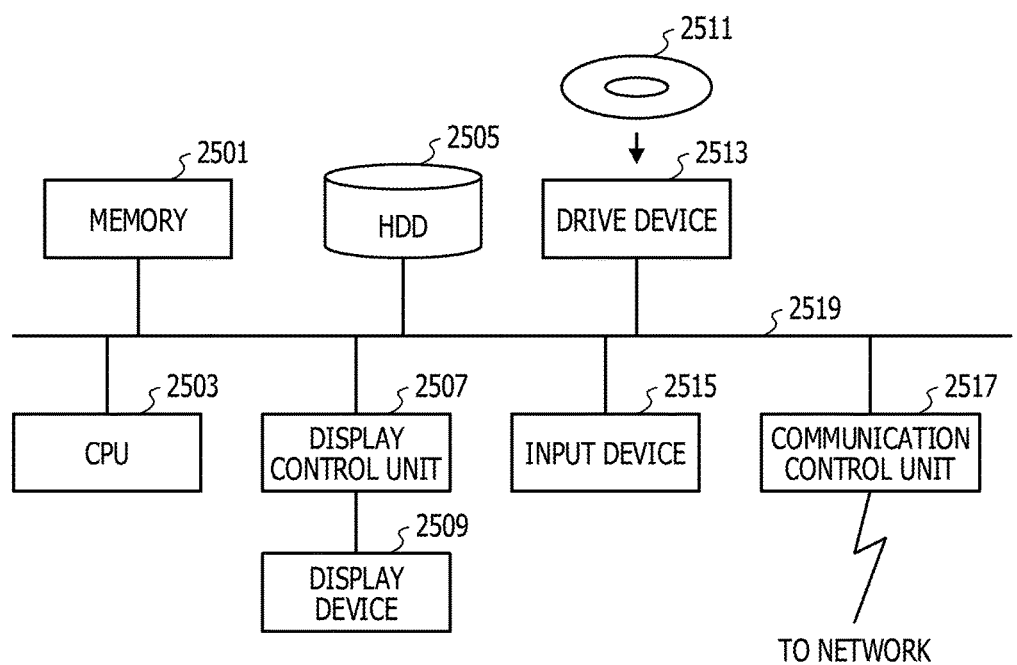
FIG. 24 is a functional block diagram of a computer.

The table storage unit 619 described above is implemented by using hardware resources (as illustrated, for example, in FIG. 24).

FIG. 7 illustrates an example of a table. The table contains data that is an example of data for managing the electronic clinical thermometer 103. The table in this example contains a record corresponding to the registered electronic clinical thermometer 103. The record has a field in which a record ID is set, a field in which a unique ID is stored, a field in which an operation ID is stored, and a field in which a terminal ID is stored.

The record ID identifies the order of the records. The unique ID is an identifier held by the registered electronic clinical thermometer 103. The unique ID is the manufacturing number of the registered electronic clinical thermometer 103, for example. The operation ID is an identifier allocated to the registered electronic clinical thermometer 103 for the convenience of operation by a user. The operation ID may be a character, a character string, or a symbol, for example. The terminal ID identifies the tablet terminal 101 with which the registered electronic clinical thermometer 103 is connected. When none of the registered electronic clinical thermometers 103 are connected with any of the tablet terminals 101, however, "no connection" is set.

For example, the first record indicates that an operation ID "1" is allocated to the electronic clinical thermometer 103 having a unique ID of "A0123". Record 1 indicates that the electronic clinical thermometer 103 having a unique ID of "A0123" is currently connected to tablet terminal 101 having an ID of "T03".

Similarly, record 2 indicates that an operation ID "2" is allocated to the electronic clinical thermometer 103 having a unique ID of "A0125". Record 2 indicates that the electronic clinical thermometer 103 as above is currently not connected to any tablet terminal 101.

Record 4 is empty. If a record corresponding to a new electronic clinical thermometer 103 is provided in this state, record 4 will be populated.

The operation of the tablet terminal 101, the electronic clinical thermometer 103, and the server 105 will be described below according to the sequence of registering a new electronic clinical thermometer 103 (hereafter, referred to as a registration phase) and using the registered electronic clinical thermometer 103 (hereafter, referred to as a use phase).

Figure 8:
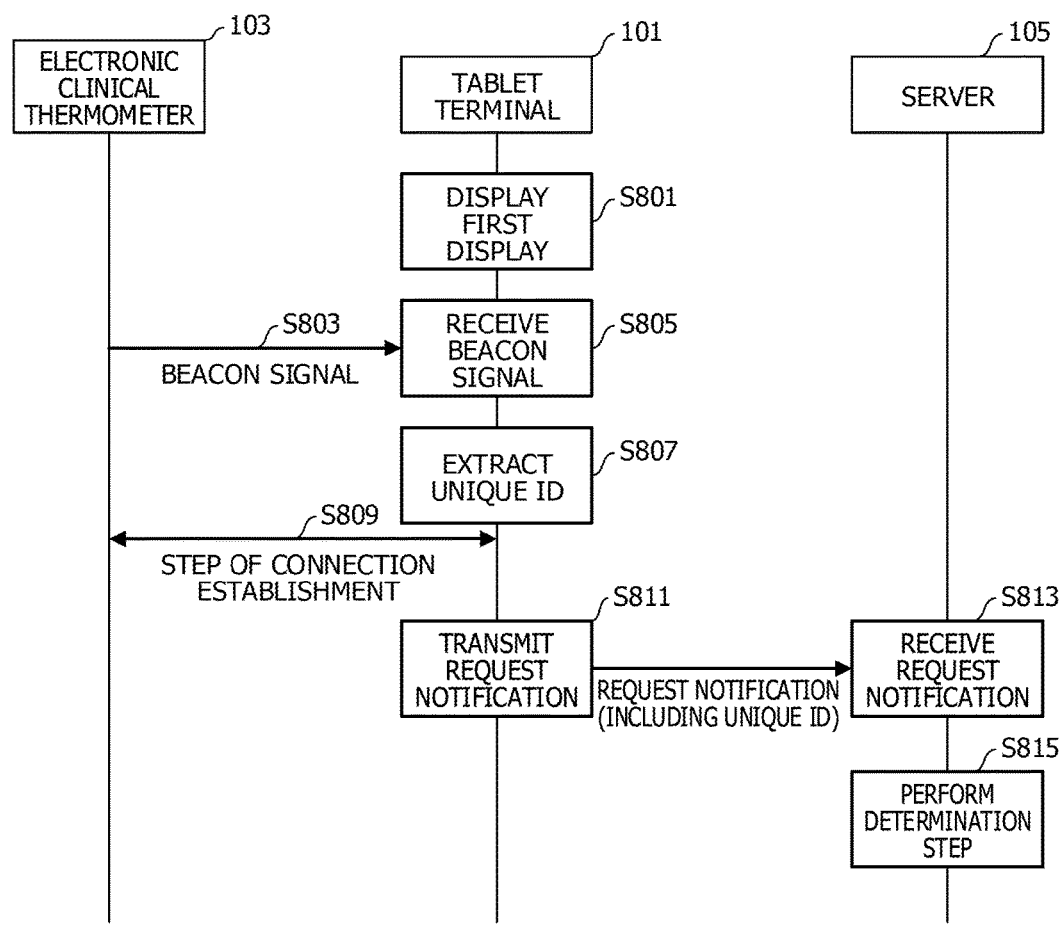
FIG. 8 is a diagram illustrating an example a sequence in a registration phase.

First, the registration phase will be described. FIG. 8 illustrates an example of the sequence in the registration phase. In the registration phase, first, the display processing unit 509 of the tablet terminal 101 displays a first display (S801).

Figure 9:
FIG. 9 is a diagram illustrating an example of a first display.

FIG. 9 illustrates an example of the first display. The first display indicates content that prompts a user to connect, to the tablet terminal 101, the electronic clinical thermometer 103 which the user intends to register. The first display indicates a message such as "Please connect to new electronic clinical thermometer". When a connection is established between the tablet terminal 101 and the electronic clinical thermometer 103 by step S809 described later, the first display may be cleared.

Turning back to the description of FIG. 8, the first receiving unit 501 of the tablet terminal 101 receives a beacon signal transmitted from the electronic clinical thermometer 103 (S803, S805). The detection unit 511 of the tablet terminal 101 detects the electronic clinical thermometer 103 by acquiring the unique ID included in the beacon signal (S807).

The connection processing unit 513 of the tablet terminal 101 then performs a step of establishing a connection to the electronic clinical thermometer 103 that is the source of the beacon signal via the first receiving unit 501 and the first transmission unit 503 of the tablet terminal 101 (S809).

When the connection to the electronic clinical thermometer 103 fails, the process returns to the step of receiving a beacon signal in a similar manner to the case of S805.

On the other hand, once the connection to the electronic clinical thermometer 103 is established, the second transmission unit 507 of the tablet terminal 101 transmits, to the server 105, a notification that requests registration of the electronic clinical thermometer 103 (hereafter, referred to as a request notification) (S811). The request notification includes the unique ID of the electronic clinical thermometer 103 to be registered.

Once the receiving unit 601 of the server 105 receives a request notification (S813), the determination unit 605 of the server 105 performs a determination step (S815). In the determination step, the determination unit 605 of the server 105 determines whether or not the unique ID included in the request notification is registered in the table. If the unique ID included in the request notification does not match a unique ID stored in any of the records, the determination unit 605 of the server 105 determines that the unique ID is not registered. On the other hand, if the unique ID included in the request notification does match a unique ID stored in any of the records, the determination unit 605 of the server 105 determines that the unique ID has already been registered.

Figure 10:
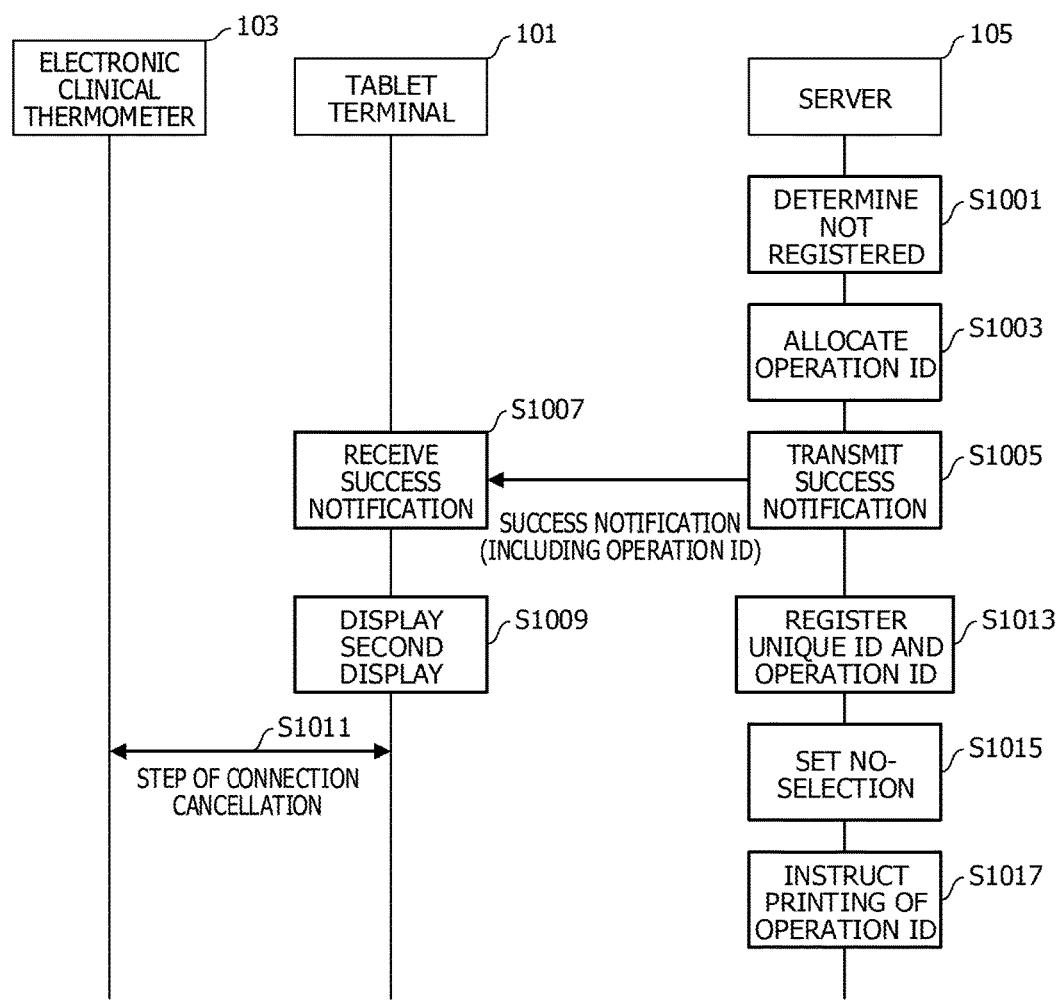
FIG. 10 is a diagram illustrating an example of a sequence in a registration phase.

FIG. 10 illustrates the subsequent part of the sequence of FIG. 8. If the determination unit 605 of the server 105 determines that the unique ID is not registered (S1001), the allocation unit 607 of the server 105 allocates a new operation ID in association with the unique ID (S1003). The transmission unit 603 of the server 105 then transmits, to the tablet terminal 101, a success notification including the allocated operation ID (S1005). The success notification indicates that the registration is successful.

In this example, the operation ID is determined in accordance with the notification and is set incrementally in ascending order. However, a user may designate the operation ID. For example, the accepting unit 519 of the tablet terminal 101 may accept a number, a character, or a character string used as the operation ID, and the second transmission unit 507 of the tablet terminal 101 may transmit the number, the character, or the character string to the server 105. The receiving unit 601 of the server 105 may receive the number, the character, or the character string, and the allocation unit 607 of the server 105 may use the received number, the received character, or the received character string as the operation ID.

If the second receiving unit 505 of the tablet terminal 101 receives a success notification (S1007), the display processing unit 509 of the tablet terminal 101 displays a second display (S1009).

FIG. 11 illustrates an example of the second display. The second display indicates that the electronic clinical thermometer 103 has been registered and the operation ID included in the success notification. The second display displays a message such as "New electronic clinical thermometer has been registered. Operation ID is "4"". When a predetermined time has elapsed since the display start time, the second display may be cleared.

Turning back to the description of FIG. 10, the connection processing unit 513 of the tablet terminal 101 then performs a step of cancelling the connection with the electronic clinical thermometer 103 (S1011).

On the other hand, the registration unit 609 of the server 105 registers the unique ID and the operation ID by storing these IDs in a table (S1013). Specifically, the unique ID and the operation ID are stored in a new record of the table. The registration unit 609 of the server 105 sets "no connection" in the terminal ID field of the record (S1015).

The instruction unit 611 of the server 105 then instructs the printer 107 to print the operation ID (S1017). In accordance with this instruction, the printer 107 prints the operation ID on a label. The tablet terminal 101 may instruct the printer 107 to print the operation ID. The label is attached to the electronic clinical thermometer 103, for example, and used for visually identifying the electronic clinical thermometer 103. The step of instructing printing may be omitted.

Figure 12:
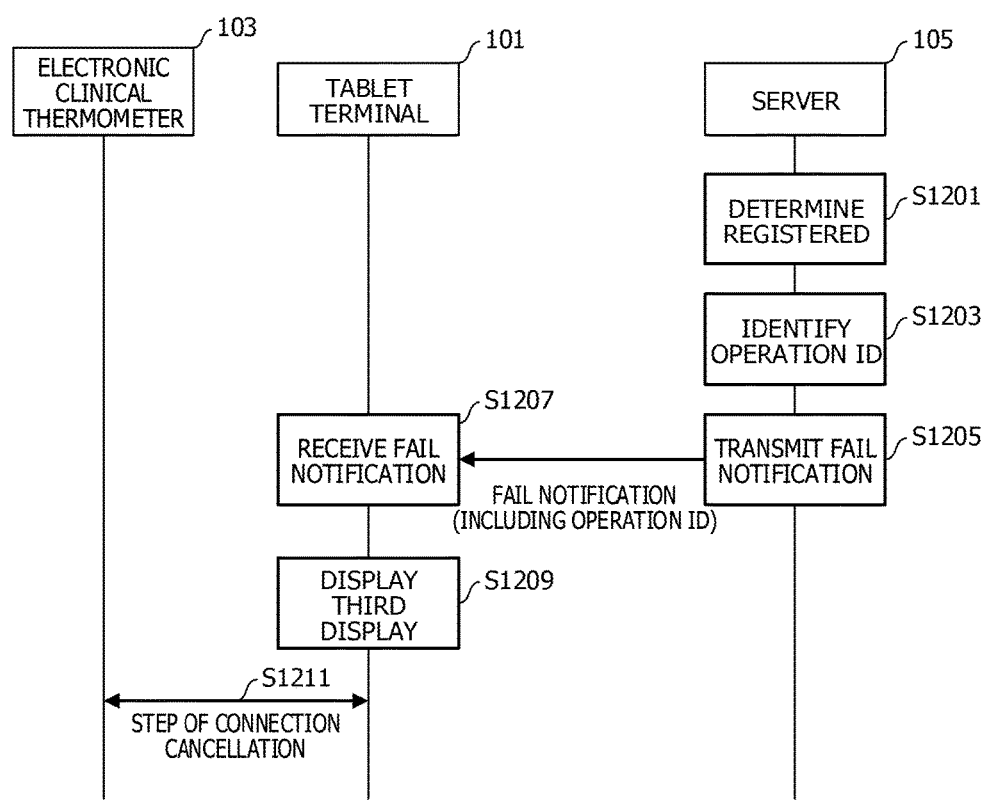
FIG. 12 is a diagram illustrating an example of a sequence in a registration phase.

FIG. 12 illustrates the sequence of a case where it is determined in the determination step illustrated in FIG. 8 that the unique ID has been registered. If it is determined that the unique ID has been registered (S1201), the identification unit 613 of the server 105 identifies the operation ID associated with the unique ID in the table (S1203). The transmission unit 603 of the server 105 transmits a fail notification including the operation ID to the tablet terminal 101 (S1205). The fail notification indicates that the registration has failed.

Once the second receiving unit 505 of the tablet terminal 101 receives a fail notification (S1207), the display processing unit 509 of the tablet terminal 101 displays a third display (S1209).

FIG. 13 illustrates an example of the third display. The third display indicates that the electronic clinical thermometer 103 has already been registered and the operation ID included in the fail notification. The third display indicates a message such as "This electronic clinical thermometer is already registered. Operation ID is "1"". When a predetermined time has elapsed since the display start time, the third display may be cleared.

Turning back to the description of FIG. 12, the connection processing unit 513 of the tablet terminal 101 then performs a step of cancelling the connection to the electronic clinical thermometer 103 (S1211). The display step of the third display may be omitted. The description of the registration phase ends.

Figure 14:
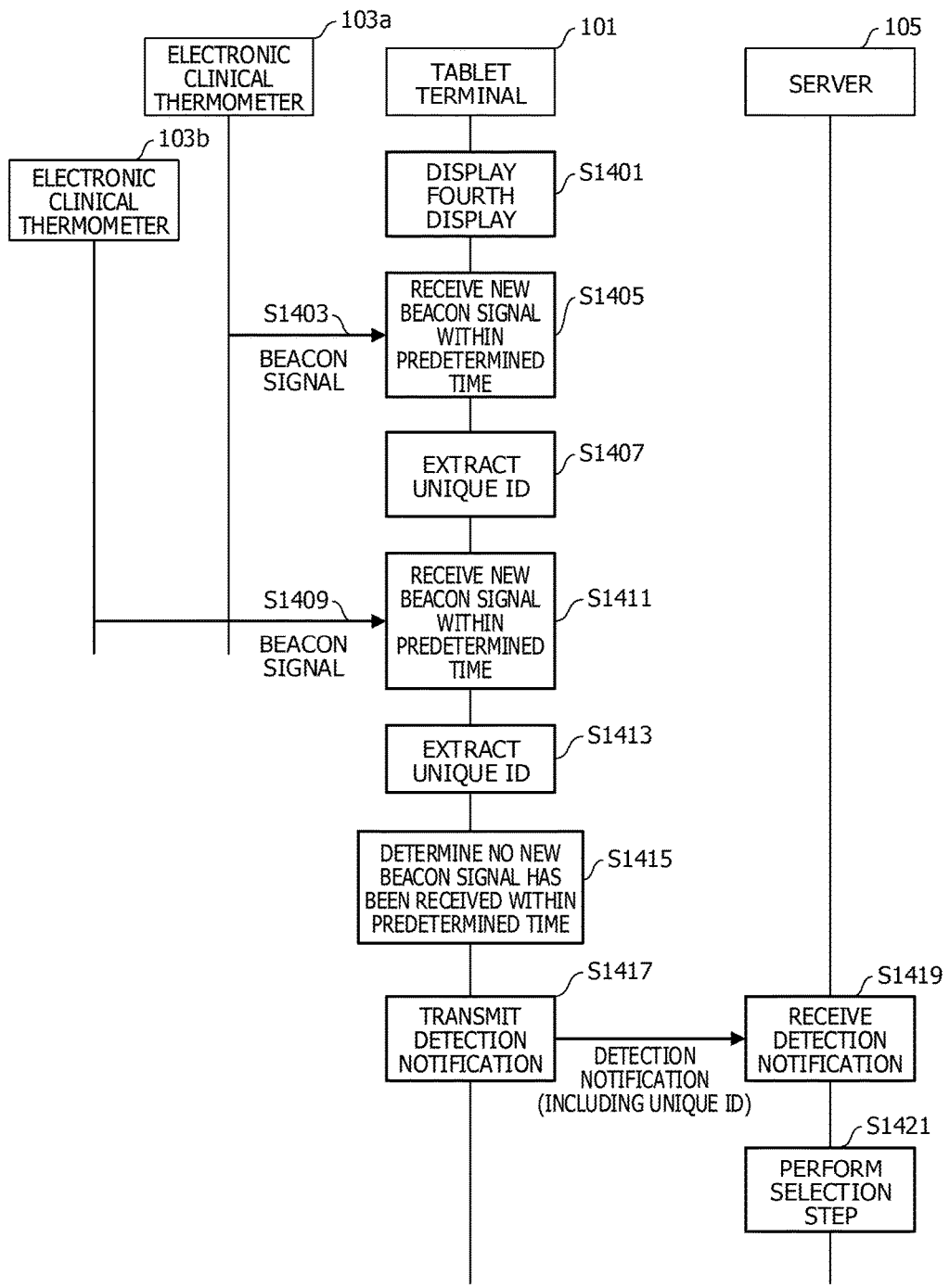
FIG. 14 is a diagram illustrating an example of a sequence in a use phase.

Next, the use phase will be described. FIG. 14 illustrates an example of the sequence in the use phase. In the use phase, first, the display processing unit 509 of the tablet terminal 101 displays a fourth display (S1401).

Figure 15:
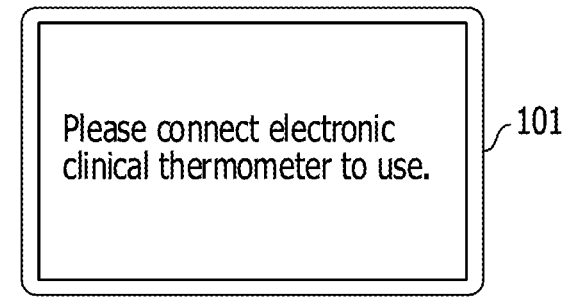
FIG. 15 is a diagram illustrating an example of a fourth display.

FIG. 15 illustrates an example of the fourth display. The fourth display indicates a content that prompts a user to connect, to the tablet terminal 101, the electronic clinical thermometer 103 which the user intends to use. The fourth display indicates a message such as "Please connect to new electronic clinical thermometer to use". When it is determined that no beacon signal is received within a predetermined time period, the fourth display may be cleared.

Turning back to the description of FIG. 14, first, it is assumed that an electronic clinical thermometer 103a is in close proximity of the tablet terminal 101. The electronic clinical thermometer 103a is transmitting a beacon signal including the unique ID thereof (S1403).

Before a predetermined time has elapsed from the step of S1401, the first receiving unit 501 of the tablet terminal 101 receives the beacon signal transmitted from the electronic clinical thermometer 103a (S1405). The detection unit 511 of the tablet terminal 101 detects the electronic clinical thermometer 103a by acquiring the unique ID included in a new beacon signal (S1407). If the same beacon signal has been repeatedly received, no process is performed on the beacon signal received on and after the second time.

Next, it is assumed that an electronic clinical thermometer 103b is in close proximity of the tablet terminal 101. The electronic clinical thermometer 103b is transmitting a beacon signal including the unique ID thereof (S1409).

Before a predetermined time has elapsed from the step of S1405, the first receiving unit 501 of the tablet terminal 101 receives the beacon signal transmitted from the electronic clinical thermometer 103b (S1411). The detection unit 511 of the tablet terminal 101 detects the electronic clinical thermometer 103b by acquiring the unique ID included in a new beacon signal (S1413).

It is then assumed that no other electronic clinical thermometer 103 comes close to the tablet terminal 101. The determination unit 515 of the tablet terminal 101 determines that no new beacon signal is received before a predetermined time has elapsed from the step of S1411 (S1415).

If no new beacon signal is received, the second transmission unit 507 of the tablet terminal 101 transmits a notification regarding the detected electronic clinical thermometer 103a and the detected electronic clinical thermometer 103b (hereafter, referred to as a detection notification) to the server 105 (S1417). The detection notification of this example includes the unique IDs acquired in S1407 and S1413.

Once the receiving unit 601 of the server 105 receives the detection notification (S1419), the selection unit 615 of the server 105 performs a selection step (S1421). In the selection step, the selection unit 615 of the server 105 selects the electronic clinical thermometer 103b which is not connected to any of the tablet terminals 101 out of the detected electronic clinical thermometer 103a and electronic clinical thermometer 103b. Specifically, the selection unit 615 of the server 105 selects a unique ID associated with "no connection" in the table out of the unique IDs included in the detection notification. For example, when the detection notification includes the unique ID "A0123" and "A0125", the unique ID "A0125" is selected based on the table illustrated in FIG. 7.

Figure 16:
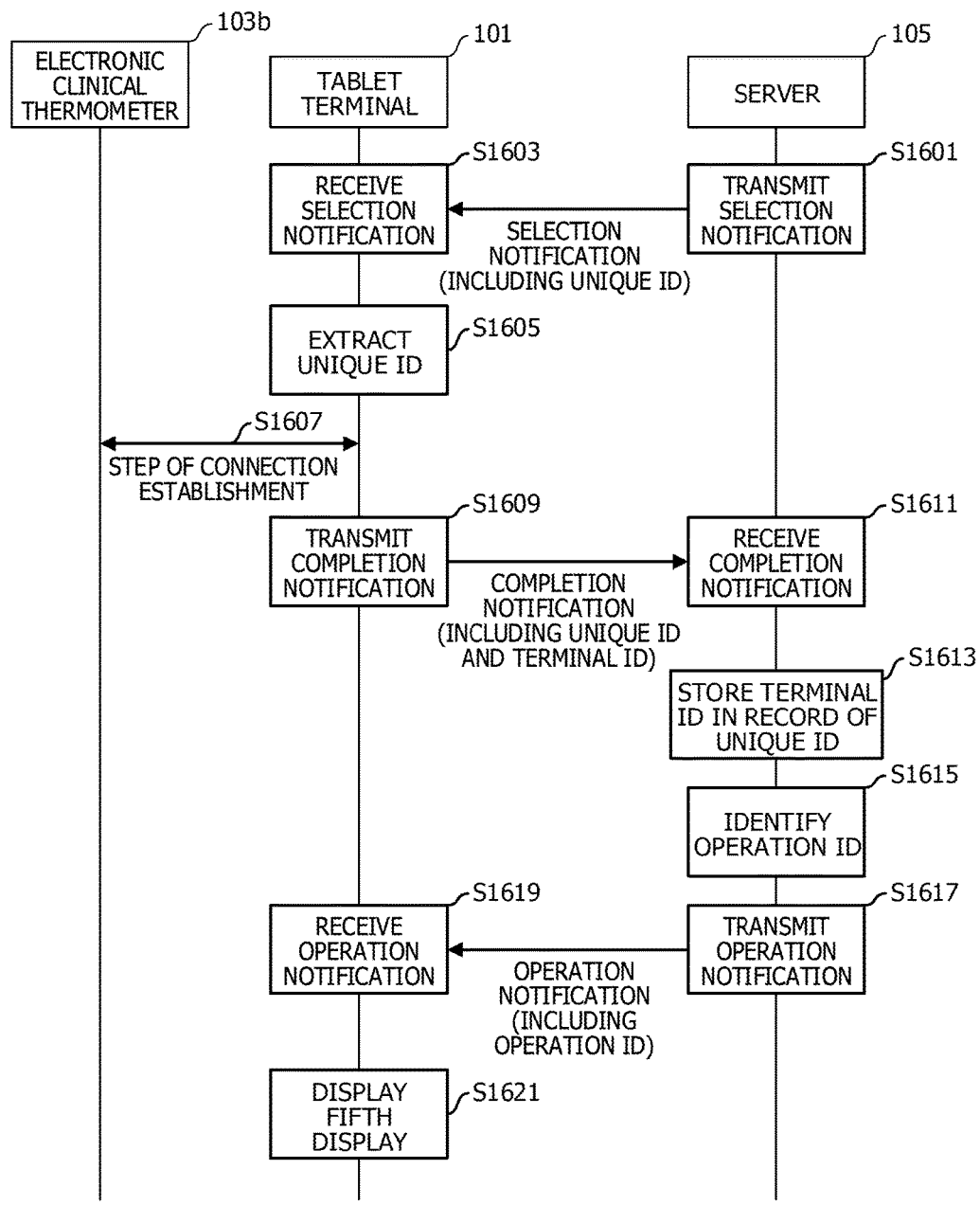
FIG. 16 is a diagram illustrating an example of a sequence in a use phase.

FIG. 16 illustrates the subsequent part of the sequence of FIG. 14. The transmission unit 603 of the server 105 transmits a notification regarding the selected electronic clinical thermometer 103b (hereafter, referred to as a selection notification) to the tablet terminal 101 (S1601). The selection notification includes the unique ID of the electronic clinical thermometer 103b selected by the selection unit 615 of the server 105.

The second receiving unit 505 of the tablet terminal 101 receives the selection notification (S1603). The connection processing unit 513 of the tablet terminal 101 extracts the unique ID from the received selection notification (S1605).

The connection processing unit 513 then performs a step of establishing a connection to the electronic clinical thermometer 103b identified by the unique ID (S1607).

In response to the establishment of the connection, the second transmission unit 507 of the tablet terminal 101 transmits a notification indicating the completion of a connection establishment (hereafter, referred to as a completion notification) to the server 105 (S1609). The completion notification includes the unique ID of the electronic clinical thermometer 103b to which the connection is established and the ID of the tablet terminal 101.

Once the receiving unit 601 of the server 105 receives the completion notification (S1611), the updating unit 617 of the server 105 identifies a record stored in the unique ID included in the completion notification. The updating unit 617 of the server 105 stores in the record the terminal ID included in the completion notification (S1613). The identification unit 613 of the server 105 identifies the operation ID associated with the unique ID included in the completion notification (S1615). Specifically, the identification unit 613 of the server 105 reads the operation ID stored in the record. If the receiving unit 601 of the server 105 receives no completion notification within a predetermined time period, it may be determined that the electronic clinical thermometer 103 is defective.

The transmission unit 603 of the server 105 transmits, to the tablet terminal 101, a notification of the operation ID allocated to the electronic clinical thermometer 103b to which the tablet terminal 101 is connected (hereafter, referred to as an operation notification) (S1617). The operation notification includes an operation ID identified in S1615.

Once the second receiving unit 505 of the tablet terminal 101 receives the operation notification (S1619), the display processing unit 509 of the tablet terminal 101 displays a fifth display (S1621).

Figure 17:
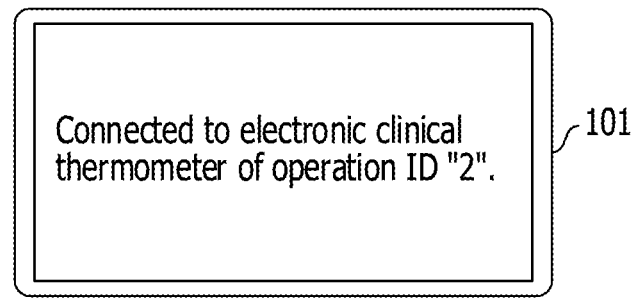
FIG. 17 is a diagram illustrating an example of a fifth display.

FIG. 17 illustrates an example of the fifth display. The fifth display indicates the fact that the connection to the electronic clinical thermometer 103b has been established and the operation ID included in the operation notification. The fifth display indicates a message such as "Connected to electronic clinical thermometer of operation ID "2"". When a predetermined time has elapsed from the display start time, the fifth display may be cleared. Instead of the message, an icon including the operation ID may be displayed. While the electronic clinical thermometer 103b is connected, the icon may be continuously displayed.

Figure 18:
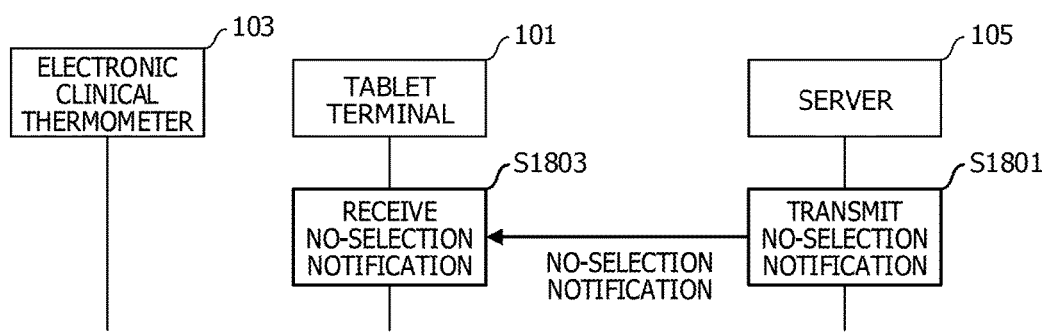
FIG. 18 is a diagram illustrating an example of a sequence in a use phase.

FIG. 18 illustrates the sequence of a case where it is determined in the selection step illustrated in S1421 of FIG. 14 that there is no electronic clinical thermometer 103 which is not connected to the tablet terminal 101. When any of the unique IDs included in the detection notification is not associated with "no connection" in the table, the selection unit 615 of the server 105 does not select any electronic clinical thermometer 103. Therefore, the transmission unit 603 of the server 105 transmits a notification of not selecting any electronic clinical thermometer 103 (hereafter, referred to as a no-selection notification) to the tablet 101 (S1801).

Once the second receiving unit 505 of the tablet terminal 101 receives the no-selection notification (S1803), the process again enters the step of detecting the electronic clinical thermometer 103. That is, the process returns to the step corresponding to the sequence illustrated in FIG. 14.

Figure 19:
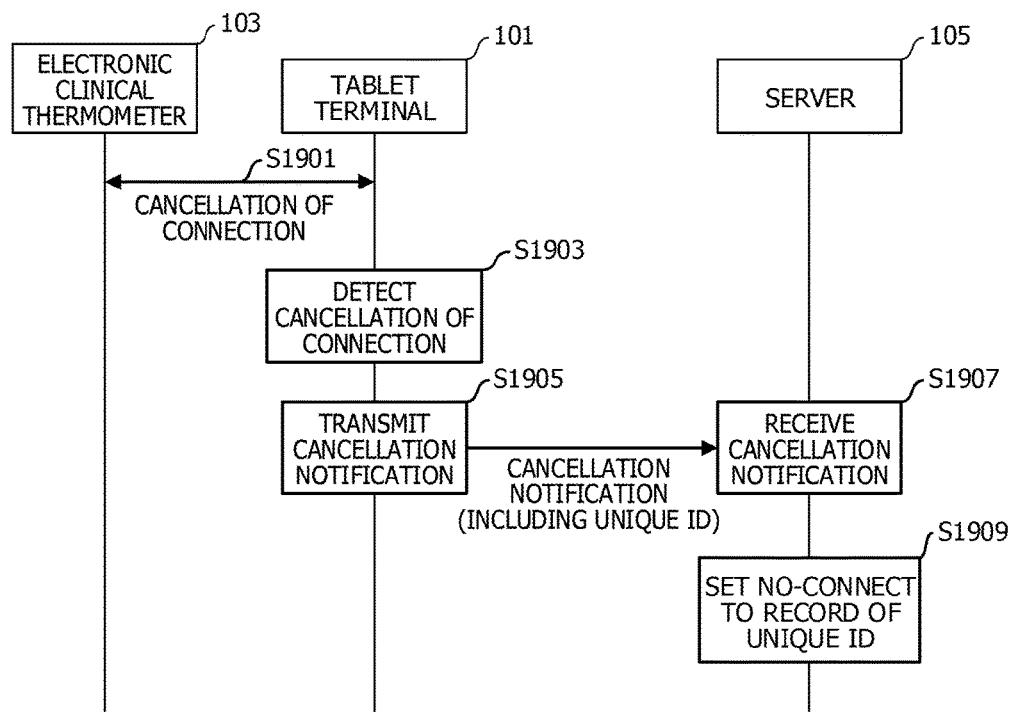
FIG. 19 is a diagram illustrating an example of a sequence in a use phase.

Finally, the sequence of a case where the connection is cancelled in the use phase will be described by using FIG. 19. Once the connection between the tablet terminal 101 and the electronic clinical thermometer 103 is cancelled (S1901), the connection processing unit 513 of the tablet terminal 101 detects cancellation of the connection (S1903). The second transmission unit 507 of the tablet terminal 101 then transmits a notification indicating that the connection has been cancelled (hereafter, referred to as a cancellation notification) to the server 105 (S1905). The cancellation notification includes the unique ID of the electronic clinical thermometer 103 to which the cancelled connection was established.

Once the receiving unit 601 of the server 105 receives the cancellation notification (S1907), the updating unit 617 of the server 105 identifies a record in which the unique ID included in the cancellation notification is stored. The updating unit 617 of the server 105 sets "no connection" to the field of the terminal ID of the record (S1909). The description of the use phase ends.

According to the present embodiment, since the operation ID is indicated instead of the unique ID, it is easier for the user to identify the electronic clinical thermometer 103 connected to the tablet terminal 101.

The server 105 can instruct the electronic clinical thermometer 103 to be connected to the tablet terminal 101.

Since the selection unit 615 selects the electronic clinical thermometer 103 which is not connected to another tablet terminal 101, a connection failure between the tablet terminal 101 and the electronic clinical thermometer 103 can be avoided.

Easier registration operation for a new electronic clinical thermometer 103 is realized.

Second Embodiment

In the present embodiment, an example will be described in which the LED 315 of the electronic clinical thermometer 103 to be registered is switched on in the registration phase.

Figure 20:
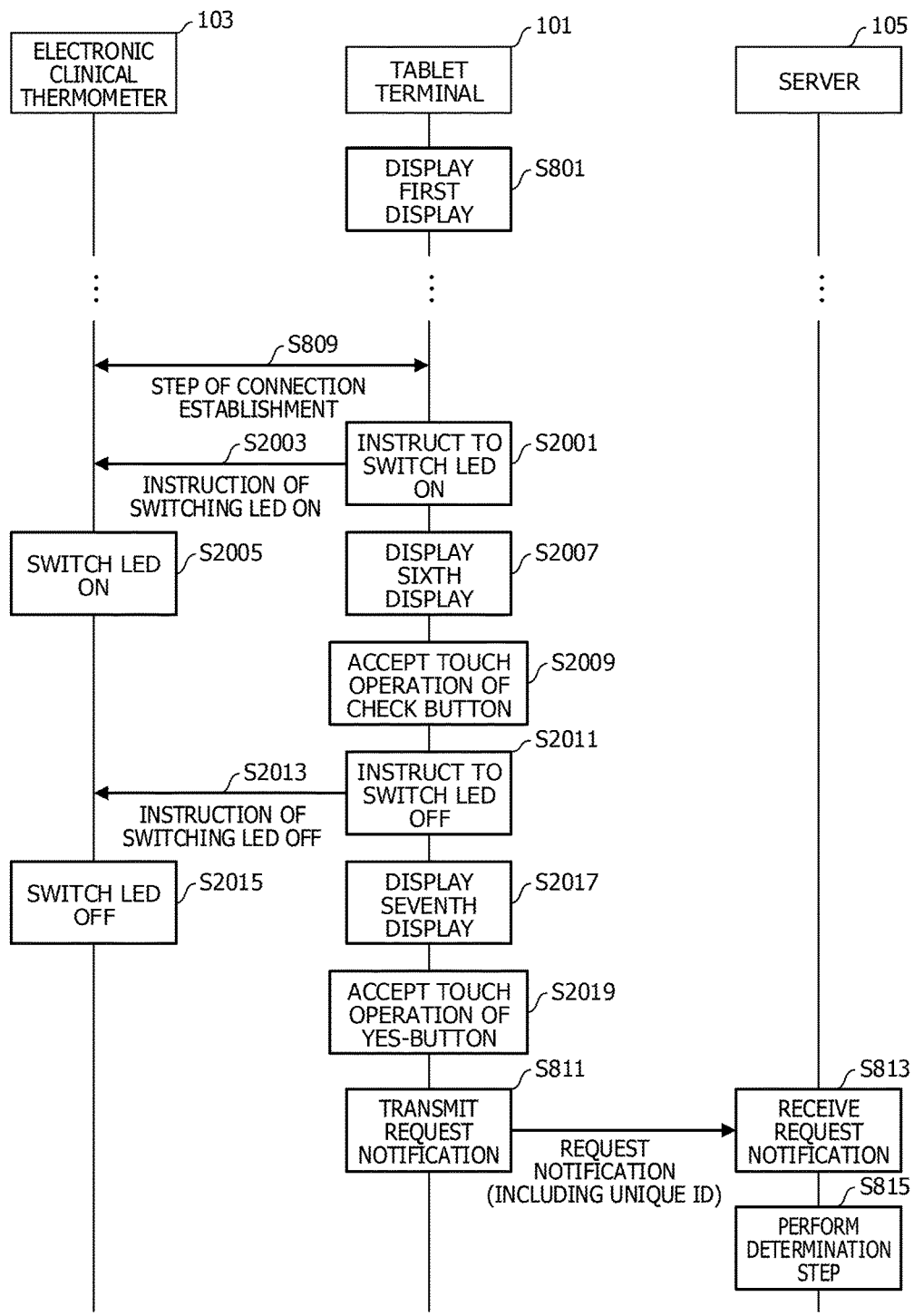
FIG. 20 is a diagram illustrating an example of a sequence in a registration phase of a second embodiment.

FIG. 20 illustrates an example of the sequence in the registered phase of the second embodiment. In the case of the second embodiment, the same steps as those of S801 to S809 illustrated in FIG. 8 are performed.

In response to establishment of a connection, the instruction unit 517 of the tablet terminal 101 instructs the electronic clinical thermometer 103 in the connection to switch the LED on (S2001). Specifically, the instruction data for switching on the LED is transmitted. The tablet terminal 101 may acquire information on the procedure for instructing to switch on the LED and switch off the LED.

In response to receiving the instruction to switch on the LED (S2003), the electronic clinical thermometer 103 switches the LED 315 on (S2005).

On the other hand, in the tablet terminal 101, the display processing unit 509 displays the sixth display (S2007).

Figure 21:
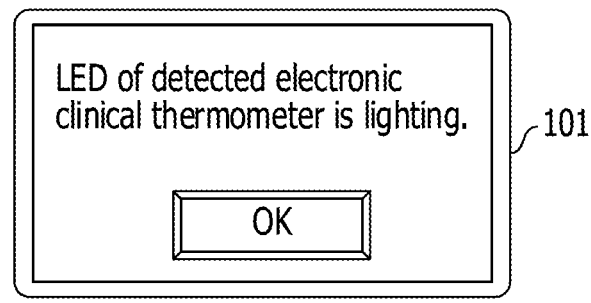
FIG. 21 is a diagram illustrating an example of a sixth display.

FIG. 21 illustrates an example of the sixth display. The sixth display depicts that the LED 315 of the detected electronic clinical thermometer 103 is switched on. The sixth display displays a message "LED of detected electronic clinical thermometer is lighting", for example. In the sixth display, a button for determining that the user has confirmed the electronic clinical thermometer 103 (hereafter, referred to as a confirmation button) is provided. The sixth display may be cancelled at the time when the confirmation button is touched.

Tuning back to FIG. 20, once the accepting unit 519 of the tablet terminal 101 accepts the touch operation of the confirmation button by the user (S2009), the instruction unit 517 of the tablet terminal 101 instructs the electronic clinical thermometer 103 to switch the LED off (S2011). Specifically, the instruction data for switching off the LED is transmitted.

In response to receiving the instruction to switch off the LED (S2013), the electronic clinical thermometer 103 switches the LED 315 off (S2015).

On the other hand, in the tablet terminal 101, the display processing unit 509 displays the seventh display (S2017).

Figure 22:
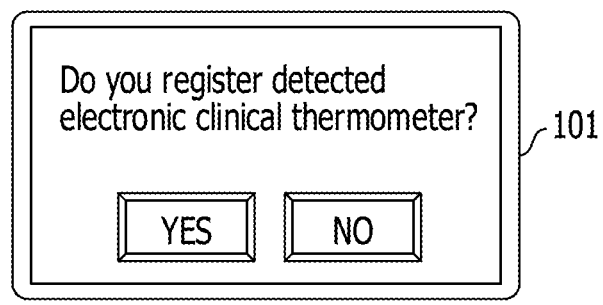
FIG. 22 is a diagram illustrating an example of a seventh display.

FIG. 22 illustrates an example of the seventh display. The seventh display depicts a content that prompts confirmation of the registration of the detected electronic clinical thermometer 103. The seventh display displays a message "Do you register detected electronic clinical thermometer?", for example. In the seventh display, a button for instructing the registration of the electronic clinical thermometer 103 (hereafter, referred to as a Yes-button) and a button for cancelling the registration (hereafter, referred to as a No-button) are provided.

Tuning back to FIG. 20, once the accepting unit 519 of the tablet terminal 101 accepts the touch operation of the Yes-button (S2019), a step similar to the step of S811 illustrated in FIG. 8 is entered. The steps of S811 to S815 are similar to those of FIG. 8.

When the accepting unit 519 of the tablet terminal 101 accepts the touch operation of the No-button, the connection processing unit 513 of the tablet terminal 101 performs the step of cancelling the connection with the electronic clinical thermometer 103, and a step of again displaying the first display is entered. That is, the process returns to the step corresponding to S801.

The instruction to switch on the LED described above is an example of the instruction of output operation for prompting the user to identify the individual. For example, a device may be instructed to make a sound. Alternatively, a device may be instructed to vibrate.

According to the present embodiment, it is easier for a user to identify the electronic clinical thermometer 103 to be registered.

Third Embodiment

An example in which an operation ID is included in a selection notification will be described in the present embodiment.

In the use phase of the present embodiment, the process in accordance with the sequence illustrated in FIG. 14 is performed in a similar manner to the case of the first embodiment.

Figure 23:
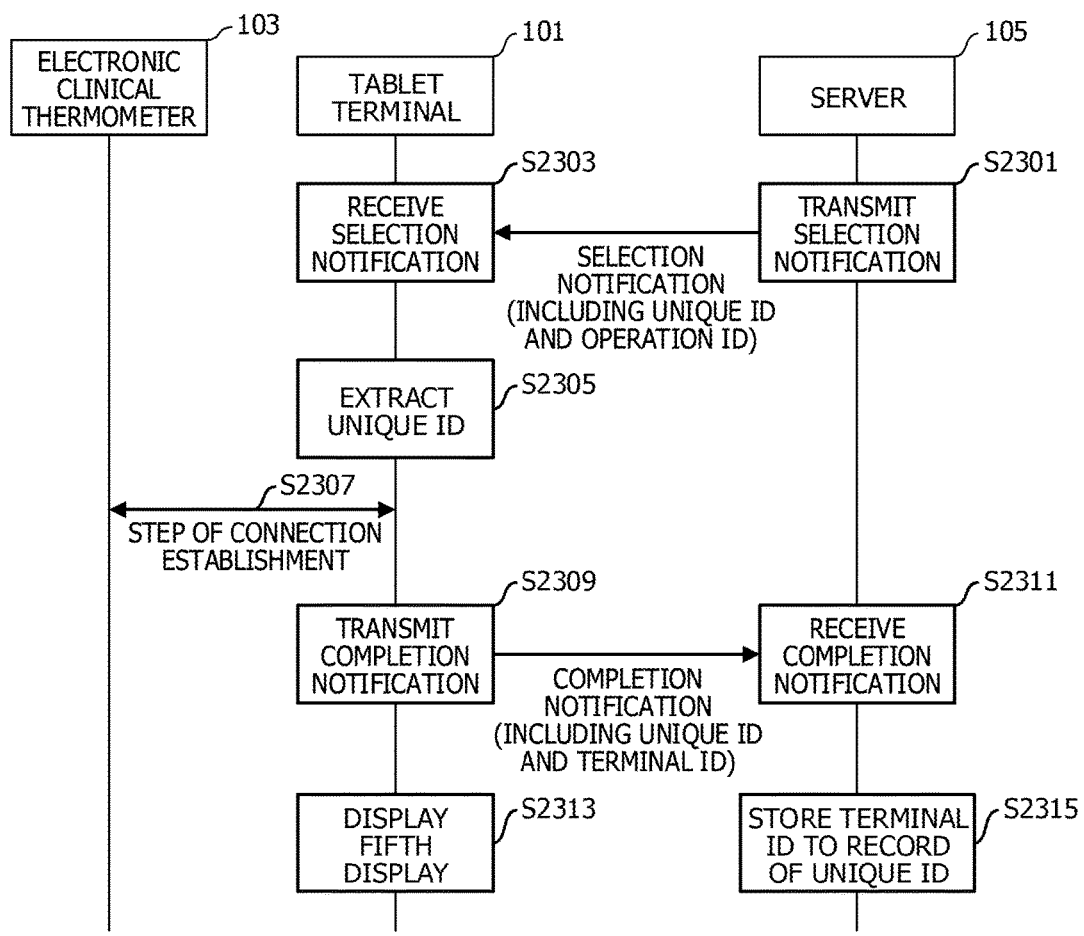
FIG. 23 is a diagram illustrating an example of a sequence in a use phase of a third embodiment.

In the present embodiment, the process in accordance with the sequence illustrated in FIG. 23 is performed instead of the sequence illustrated in FIG. 16.

In the selection step illustrated in S1421 of FIG. 14, if the selection unit 615 of the server 105 selects any of the electronic clinical thermometers 103, the transmission unit 603 of the server 105 transmits the selection notification (S2301). The selection notification in the present embodiment includes a unique ID and an operation ID of the selected electronic clinical thermometer 103. The second receiving unit 505 of the tablet terminal 101 receives this selection notification (S2303).

The steps of S2305 to S2311 are similar to those of S1605 to S1611 illustrated in FIG. 16.

After the second transmission unit 507 of the tablet terminal 101 transmits the completion notification, the display processing unit 509 displays the fifth display (S2313).

At this time, the display processing unit 509 of the tablet terminal 101 adds an operation ID included in the selection notification to a message.

The step of S2315 is similar to the step of S1613 illustrated in FIG. 16.

According to the present embodiment, the load of the communication process is reduced.

While the embodiments of the disclosure have been described above, the disclosure is not limited thereto. For example, the functional block configuration described above may not be consistent with the program module configuration.

The configuration of each storage area described above is an example and not necessarily is the same configuration as that described above. Furthermore, in the process flow, the order of steps may be exchanged or multiple steps may be executed in parallel as long as the process result does not change.

The server 105 described above is a computer apparatus. As illustrated in FIG. 24, a memory 2501, a CPU 2503, a hard disk drive (HDD) 2505, a display control unit 2507 connected to a display device 2509, a drive device 2513 for a removable disk 2511, an input device 2515, and a communication control unit 2517 for network connection are connected by a bus 2519. Operating system (OS) and an application program for implementing the process in the present embodiment are stored in the HDD 2505 and read from the HDD 2505 to the memory 2501 when executed by the CPU 2503. The CPU 2503 controls the display control unit 2507, the communication control unit 2517, and the drive device 2513 in accordance with the process of the application program for a predetermined operation. While the data being processed is mainly stored in the memory 2501, such data may be stored in the HDD 2505. In the present embodiment of the disclosure, the application program for implementing the process described above is distributed and stored in the removable disk 2511, which is able to be read by a computer, and installed from the drive device 2513 into the HDD 2505. Such an application program may be installed into the HDD 2505 via the network such as the Internet and the communication control unit 2517. Such a computer apparatus implements various functions as described above by coordinated cooperation of hardware such as the CPU 2503, the memory 2501, and the like and a program such as the application program as described above.

The embodiments described above are summarized as below.

An information processing system according to one aspect has a terminal and an information processing device. The terminal has (A) a connection processing unit that is connected through wireless communication to the device identified by a first identifier. The information processing device has (B) a determination unit that identifies a second identifier of the above device associated with the first identifier and (C) a first transmission unit that transmits the second identifier to the terminal. The terminal further has (D) a display processing unit that displays the received second identifier.

This enables a user to easily identify a device connected to the terminal, because the second identifier is indicated instead of the first identifier used for the process.

Furthermore, the first transmission unit may transmit the first identifier of the device to the terminal, and the connection processing unit may use the received first identifier.

This enables the information processing device to instruct the terminal as to which device the terminal connects to.

The terminal may further have (E) a detection unit that detects the device that is in close proximity of the terminal and (F) a second transmission unit that transmits the first identifiers of a plurality of devices to the information processing device when the plurality of devices are detected. The information processing device may further have (G) a selection unit that selects the first identifier of the device to which the terminal has to connect out of the received first identifiers of the plurality of devices. The first transmission unit may then transmit the selected first identifier as the first identifier of the above device.

This allows for determination of the device which is immediately connected to the terminal.

Furthermore, the selection unit may select the first identifier of the device which is not connected to other terminals.

This can avoid a connection failure between the terminal and the device.

The terminal may further have (H) a second transmission unit that transmits the first identifier of the connected device to the information processing device. The determination unit may then use the received first identifier.

This enables a user to identify the device which is currently connected.

The terminal may further have (I) a detection unit that detects a device which comes close to the terminal and (J) a second transmission unit that transmits the first identifier of the detected device to the information processing device. The information processing device may further have a registration unit that, when the received first identifier is unknown, registers the second identifier allocated to the detected device in association with the first identifier to device management data.

This allows for an easier registration operation for a new device.

The terminal may further have (K) an instruction unit that instructs an output operation for prompting a user to identify an individual.

This enables the user to easily identify the device to be registered.

Furthermore, the second identifier may be an identifier used for operation.

This contributes to the identification of a user.

A program can be created that causes a computer to perform the process in the information processing device and the process in the terminal as described above. Such a program may be stored in a computer readable storage medium or a computer readable storage device such as a flexible disk, a CD-ROM, a magneto-optical disk, a semiconductor memory, hard disk, or the like. In general, the intermediate process result may be temporarily saved in the storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
a plurality of terminal devices; and
an information processing device,
wherein a terminal device of the plurality of terminal devices is coupled to a device of a plurality of devices through wireless communication, and includes a first memory and a first processor coupled to the first memory and configured to:
transmit a completion notification indicating completion of connection to the device to the information processing device,
wherein the information processing device includes a second memory and a second processor coupled to the second memory and configured to:
refer to management information in which a first identifier, a second identifier, and a connection status of connection with the plurality of terminal devices are associated with each other for each of the plurality of devices to identify the second identifier that is included in the completion notification and that is associated with the first identifier that is used to identify the device, and
transmit the identified second identifier to the terminal device, and
wherein the terminal device is configured to
display the identified second identifier,
wherein the terminal device is configured to
transmit a no-selection notification indicating that the device to which the terminal device has to connect has not been selected to the information processing device when the device to which the terminal device has to connect has not been selected.

2. A information processing method executed by an information processing system including a plurality of terminal devices and an information processing device, the information processing method comprising:
coupling, by a terminal device of the plurality of terminal devices, to a device of a plurality of devices through wireless communication;
transmitting a completion notification indicating that the coupling to the device is successful to the information processing device;
referring, by the information processing device, to management information in which a first identifier, a second identifier, and a connection status of connection with the plurality of terminal devices are associated with each other for each of the plurality of devices to identify the second identifier that is included in the completion notification and associated with the first identifier that is used to identify the device, by using the information processing device,
transmitting the identified second identifier to the terminal device;
displaying, by the terminal device, the identified second identifier; and
transmitting a no-selection notification indicating that the device to which the terminal device has to connect has not been selected to the information processing device when the device to which the terminal device has to connect has not been selected.

3. The information processing method according to claim 2, further comprising:
receiving, by the terminal device, a plurality of beacon signals from the plurality of devices;
acquiring the first identifier from each of the plurality of beacon signals;
transmitting the acquired beacon signal to the information processing device;
selecting, by the information processing device, from among the plurality of devices, a device to which the terminal device has to connect in accordance with the connection status included in the management information; and transmitting a selection notification including the first identifier associated with the selected device to the terminal device.

4. The information processing method according to claim 3, wherein the selecting includes selecting, from among the plurality of devices, the device which has a connection status indicating no connection with any of the plurality of terminal devices.

5. The information processing method according to claim 3, wherein the selection notification further includes the second identifier associated with the selected device.

6. The information processing method according to claim 2, further comprising:

receiving, by the terminal device, a plurality of beacon signals;

acquiring the first identification from the received beacon signal;

transmitting, to the information processing device, a request notification that includes the acquired first identifier and requests registration in the management information;

determining, by the information processing device, whether the first identifier included in the request notification is registered in the management information by referring to the management information;

allocating the second identifier to the first identifier included in the request notification when it is determined that the first identifier included in the request notification is not registered in the management information; and executing a registration process for registering the first identifier included in the request notification and the allocated second identifier in the management information.

7. The information processing method according to claim 6, further comprising:

transmitting, by using the information processing device, a success notification including the allocated second identifier and indicating completion of the registration process to the information processing device; and displaying, by terminal device, the allocated second identifier.

8. The information processing method according to claim 7, further comprising:

acquiring, by the information processing device, the second identification associated with the first identifier included in the request notification from the management information when it is determined that the first identifier included in the request notification is registered;

transmitting a fail notification including the acquired second identifier and indicating that the registration process has failed to the information processing device; and displaying, by the terminal device, the acquired second identifier.

9. The information processing method according to claim 2, further comprising:

switching on a light source provided to the device by using the terminal device when connection to the device through the wireless communication is established.

* * * * *